US012753968B2

(12) United States Patent
Sato et al.

(10) Patent No.: US 12,753,968 B2
(45) Date of Patent: Oct. 6, 2026

(54) INFORMATION PROCESSING DEVICE AND PROGRAM

(71) Applicants: DAIKIN INDUSTRIES, LTD., Osaka (JP); The University of Tokyo, Tokyo (JP)

(72) Inventors: Daisuke Sato, Osaka (JP); Yasuki Kansha, Tokyo (JP)

(73) Assignees: DAIKIN INDUSTRIES, LTD., Osaka (JP); THE UNIVERSITY OF TOKYO, Tokyo (JP)

( * ) Notice: Subject to any disclaimer, the term of this patent is extended or adjusted under 35 U.S.C. 154(b) by 466 days.

(21) Appl. No.: 18/283,027

(22) PCT Filed: Feb. 25, 2022

(86) PCT No.: PCT/JP2022/007770

§ 371 (c)(1),
(2) Date: Sep. 20, 2023

(87) PCT Pub. No.: WO2022/202087

PCT Pub. Date: Sep. 29, 2022

(65) Prior Publication Data

US 2024/0167760 A1 May 23, 2024

(30) Foreign Application Priority Data

Mar. 25, 2021 (JP) ................................ 2021-052072

(51) Int. Cl.
*G06Q 10/087* (2023.01)
*F25D 29/00* (2006.01)
*G06F 3/0482* (2013.01)

(52) U.S. Cl.
CPC ........... *F25D 29/00* (2013.01); *G06F 3/0482* (2013.01); *G06Q 10/087* (2013.01); *F25D 2500/04* (2013.01); *F25D 2700/16* (2013.01)

(58) Field of Classification Search
CPC .. F25D 29/00; F25D 2500/04; F25D 2700/16; F25D 13/00; G06F 3/0482; G06Q 10/087; G06Q 10/0832; G06Q 10/04
See application file for complete search history.

(56) References Cited

U.S. PATENT DOCUMENTS

2008/0047282 A1* 2/2008 Bodin .................. G06Q 10/087 62/129
2012/0260683 A1* 10/2012 Cheon ..................... F25D 29/00 62/125
2021/0190416 A1* 6/2021 Ge .......................... F25D 29/00

FOREIGN PATENT DOCUMENTS

JP 2000-258015 A 9/2000
JP 2002-147916 A 5/2002
(Continued)

OTHER PUBLICATIONS

FoodHero "Smart Stacking 101: Howto Store Food in Yourfridge Like a Pro" Published: Feb. 17, 2021 (Year: 2021).*
(Continued)

*Primary Examiner* — Yuhui R Pan
(74) *Attorney, Agent, or Firm* — Birch, Stewart, Kolasch & Birch, LLP

(57) ABSTRACT

Placement of items to be stored is proposed according to how the items to be stored in a chamber performing freezing or refrigerating are cooled. An information processing device including: a prediction section that predicts how items to be stored in a chamber performing freezing or refrigerating are cooled; and an output section that outputs proposal information on the placement of the items to be stored in the chamber performing freezing or refrigerating based on how the items to be stored in the chamber are cooled as predicted by the prediction section.

19 Claims, 7 Drawing Sheets

(56) References Cited

FOREIGN PATENT DOCUMENTS

| | | | | | |
|---|---|---|---|---|---|
| JP | 2009-215007 | A | | 9/2009 | |
| JP | 2010-112605 | A | | 5/2010 | |
| JP | 2018-124059 | A | | 8/2018 | |
| WO | WO 2011/111382 | A1 | | 9/2011 | |
| WO | WO-2019229838 | A1 | * | 12/2019 | ............. F25D 13/02 |

OTHER PUBLICATIONS

International Search Report (PCT/ISA/210), issued in PCT/JP2022/007770, dated Apr. 5, 2022.

* cited by examiner

INFORMATION PROCESSING DEVICE AND PROGRAM

TECHNICAL FIELD

The present disclosure relates to an information processing device, and a program.

BACKGROUND ART

Patent Document 1 describes, for example, the technology for proper storage management of goods, such as commodities, by placing the commodities, etc. in the vertical temperature distribution area within the space of the appropriate temperature for the goods.

CITATION LIST

Patent Literature

Patent Document 1: Japanese Patent Laid-Open No. 2010-112605

SUMMARY OF INVENTION

Technical Problem

The way in which items to be stored in a chamber are cooled depends on conditions. Therefore, it is difficult to cool the stored items efficiently by simply placing thereof in the chamber.

An object of the present disclosure is to propose placement of items to be stored in a chamber performing freezing or refrigerating according to how the stored items are cooled.

Solution to Problem

An information processing device of the present disclosure includes: a prediction section predicting how a stored item cools in a chamber performing freezing or refrigerating; and an output section outputting proposal information about placement of an item to be stored in the chamber based on how the stored item cools as predicted by the prediction section.

According to the information processing device, placement of stored items can be proposed in accordance with how the items to be stored in a chamber performing freezing or refrigerating are cooled.

The prediction section may predict how a stored item cools in the chamber using a thermal time constant of an item to be stored in the chamber.

With this, it is possible to predict how the stored item cools without complicated calculations.

The prediction section may predict how a stored item cools in the chamber further using temperature information of an item to be stored in the chamber before being stored.

With this, it is possible to predict how the stored item cools while taking into account the temperature information of the item to be stored in the chamber before being stored.

The prediction section may predict how a stored item cools in the chamber further using target temperature information of an item to be stored in the chamber.

With this, it is possible to predict how the stored item cools while taking into account the target temperature information of the item to be stored in the chamber.

The prediction section may predict how a stored item cools in the chamber using a physical model that models an item to be stored in the chamber.

With this, it is possible to predict how the stored item cools with less calculation amount compared to a case where the physical model is not used.

The prediction section may predict a temperature at each position in the chamber, and the output section may output the proposal information further based on the temperature at each position in the chamber predicted by the prediction section.

With this, it is possible to propose placement of stored items in accordance with the temperature at each position in a chamber performing freezing or refrigerating.

The prediction section may predict the temperature at each position in the chamber using measurement information of a temperature measured at a predetermined position in the chamber.

With this, it is possible to predict the temperature at each position in the chamber while reducing the number of devices measuring the temperature in the chamber.

The prediction section may predict the temperature at each position in the chamber further using thermal characteristics inside the chamber.

With this, it is possible to predict the temperature at each position in the chamber while taking into account the thermal characteristics inside the chamber.

The prediction section may predict the temperature at each position in the chamber further using operation information of a cooling device performing freezing or refrigerating inside the chamber.

With this, it is possible to predict the temperature at each position in the chamber while taking into account the operation information of the cooling device performing freezing or refrigerating inside the chamber.

The prediction section may predict the temperature at each position in the chamber further using information of heat emitted by a stored item already existing in the chamber.

With this, it is possible to predict the temperature at each position in the chamber while taking into account the information of heat emitted by the stored item already existing in the chamber.

The prediction section may predict the temperature at each position in the chamber further using information of disturbance caused in the chamber.

With this, it is possible to predict the temperature at each position in the chamber while taking into account the information of the disturbance caused in the chamber.

The prediction section may predict the temperature at each position in the chamber using a physical model that models an interior of the chamber.

With this, it is possible to predict the temperature at each position in the chamber with less calculation amount compared to a case where the physical model is not used.

The prediction section may predict effect of heat emitted by an item to be stored in the chamber on the temperature at each position in the chamber, and the output section may output the proposal information further based on the effect on the temperature at each position in the chamber, the effect being predicted by the prediction section.

With this, it is possible to propose placement of stored items in accordance with the effect of heat emitted by the item to be stored in the chamber on the temperature at each position in the chamber.

The prediction section may predict the effect on the temperature at each position in the chamber using a physical model that models an item to be stored in the chamber.

With this, it is possible to predict the effect of heat emitted by the stored item on the temperature at each position in the chamber with less calculation amount compared to a case where the physical model is not used.

The output section may output the proposal information proposing placement of an item to be stored in the chamber, the placement cooling the item in a shorter time.

With this, it is possible to propose the placement of the stored items in a freezing or refrigerating environment that cools in a shorter time.

The output section may output the proposal information including information on how to stack an item to be stored in the chamber.

With this, it is possible to propose the placement of the stored items with a favorable stacking method.

The output section may output the proposal information including information on a distance between an item to be stored in the chamber and another stored item.

With this, it is possible to propose the placement of the stored items with favorable distances.

The output section may output the proposal information representing the placement using an object image corresponding to an item to be stored in the chamber.

With this, it is possible to improve visualization of the placement of the stored items compared to a case where the object image is not used.

The output section may output the proposal information on setting of a cooling device performing freezing or refrigerating inside the chamber.

With this, it is possible to store the items in a favorable freezing or refrigerating environment even in the case where favorable placement is unavailable.

In addition, a program of the present disclosure causes a computer to implement: a function of predicting how a stored item cools in a chamber performing freezing or refrigerating; and a function of outputting proposal information on placement of an item to be stored in the chamber based on how the stored item cools as predicted.

According to a computer installing the program, it is possible to propose placement of stored items in accordance with how the items to be stored in a chamber performing freezing or refrigerating are cooled.

DESCRIPTION OF EMBODIMENT

Hereinafter, an embodiment will be described in detail with reference to attached drawings.

[Overall Configuration of Freezing/Refrigerating System]

Figure 1:
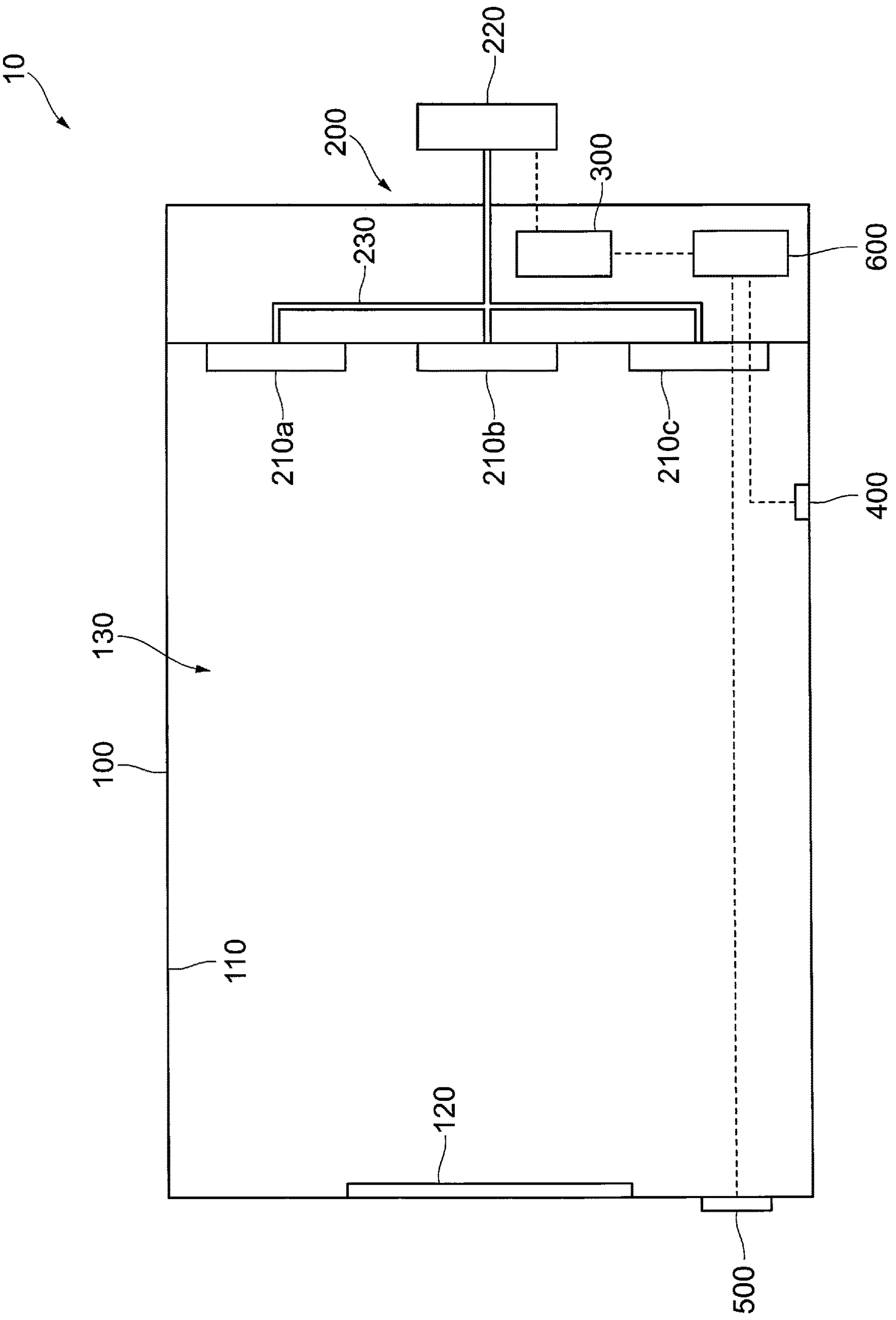
FIG. 1 is a diagram showing an overall configuration example of a freezing/refrigerating system to which the present embodiment is applied.

FIG. 1 is a diagram showing an overall configuration example of a freezing/refrigerating system 10 to which the present embodiment is applied. As shown in the figure, the freezing/refrigerating system 10 performs freezing and refrigerating in a freezer/refrigerator warehouse 100, and includes a freezing/refrigerating device 200, a control device 300, a temperature sensor 400, an input/output device 500, and an information processing device 600.

The freezer/refrigerator warehouse 100 is a warehouse for freezing or refrigerating items to be stored therein. The freezer/refrigerator warehouse 100 includes an insulation wall 110, an opening/closing door 120, and a storage space 130. The insulation wall 110 is a wall to increase heat-retaining characteristics of the freezer/refrigerator warehouse 100 by being covered with insulation panels. The opening/closing door 120 is a door that opens and closes when storing the items in the freezer/refrigerator warehouse 100. The opening/closing door 120 is filled with a heat insulating material to also increase the heat-retaining characteristics of the freezer/refrigerator warehouse 100 when being closed. The storage space 130 is a space for storing the items. In the storage space 130, though not illustrated, plural shelves for placing and storing the items may be installed on the insulation wall 110.

The freezing/refrigerating device 200 is a device actually performing freezing and refrigerating for the freezer/refrigerator warehouse 100. The freezing/refrigerating device 200 includes indoor units 210*a* to 210*c*, an outdoor unit 220, and piping 230. The indoor units 210*a* to 210*c* are installed in the freezer/refrigerator warehouse 100 and absorb heat from the air in the freezer/refrigerator warehouse 100 by exchanging heat between the refrigerant coming through the piping 230 and the air in the freezer/refrigerator warehouse 100. The outdoor unit 220 is installed outside the freezer/refrigerator warehouse 100 and discharges heat to the outside of the freezer/refrigerator warehouse 100 by exchanging heat between the refrigerant coming through the piping 230 and the air outside the freezer/refrigerator warehouse 100. The piping 230 is a pipe connecting the indoor units 210*a* to 210*c* and the outdoor unit 220, through which the refrigerant passes. Note that the indoor units 210*a* to 210*c* are shown in the figure, but in the case where there is no need to distinguish the indoor units, the units are sometimes referred to as the indoor units 210. The figure shows three indoor units 210; however, one, two, or four or more indoor units 210 may be installed. In the present embodiment, the freezing/refrigerating device 200 is provided as an example of a cooling device for freezing or refrigerating inside the warehouse.

The control device 300 is a device that controls the freezing/refrigerating device 200 to operate based on the set conditions.

The temperature sensor 400 is installed at a predetermined position in the freezer/refrigerator warehouse 100, and measures the temperature at the predetermined position.

For example, the input/output device 500 is installed beside the opening/closing door 120 of the freezer/refrigerator warehouse 100, and accepts user operations to input information about the items to be stored in freezer/refrigerator warehouse 100, and outputs proposal information about the placement of the items to be stored in the freezer/refrigerator warehouse 100. The input/output device 500 may be a touch panel, for example.

The information processing device 600 creates the proposal information about the placement of the items to be stored in the freezer/refrigerator warehouse 100, and outputs the information to the input/output device 500. Specifically, the information processing device 600 first acquires various pieces of information from the freezing/refrigerating device 200, the temperature sensor 400, the input/output device 500, etc. Next, the information processing device 600 uses the various pieces of information to determine the temperature distribution in the freezer/refrigerator warehouse 100 and how the items to be stored in the freezer/refrigerator warehouse 100 cool. Next, the information processing device 600 creates the proposal information based on the temperature distribution, how the items cool, etc. Then, the information processing device 600 outputs the proposal information to the input/output device 500.

[Hardware Configuration of Information Processing Device]

Figure 2:
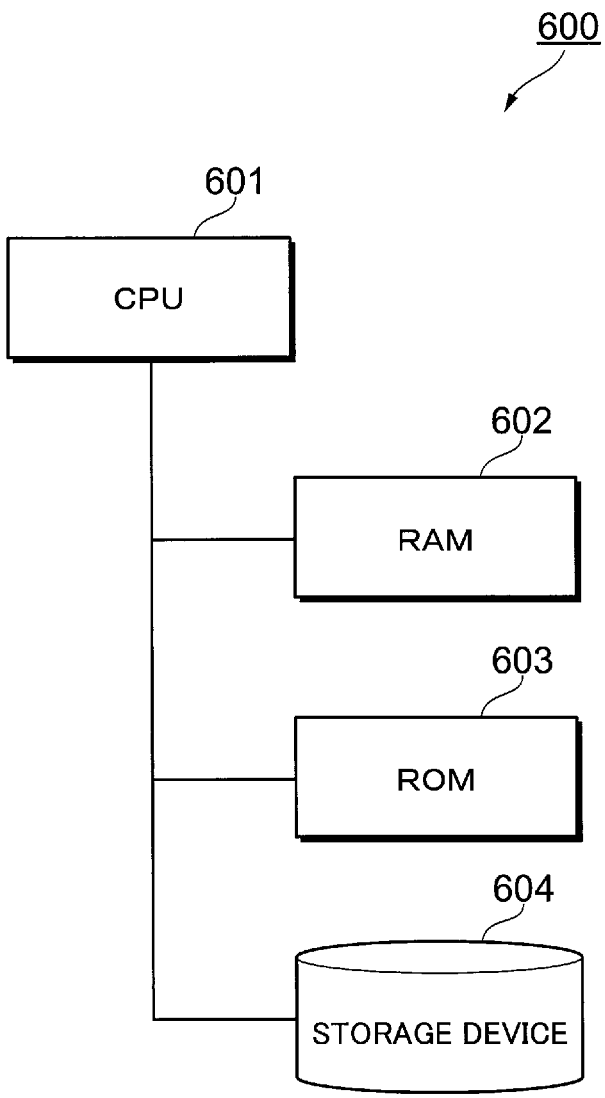
FIG. 2 is a diagram showing a hardware configuration example of an information processing device in the present embodiment.

FIG. 2 is a diagram showing a hardware configuration example of the information processing device 600 in the present embodiment. As shown in the figure, the information processing device 600 includes a CPU (Central Processing Unit) 601, which is an arithmetic unit, a RAM (Random Access Memory) 602, which is a storage unit, a ROM (Read Only Memory) 603, and a storage device 604. The RAM 602 is a main storage device (main memory), and used as a working memory when the CPU 601 performs arithmetic processing. The ROM 603 holds programs and data of setting values prepared in advance, etc., and the CPU 601 can execute processing by directly reading the programs and data from the ROM 603. The storage device 604 is a storing unit for programs and data. The storage device 604 stores the programs, and the CPU 601 reads the programs stored in the storage device 604 into the main storage device to execute thereof. In addition, the storage device 604 stores the processing results by the CPU 601 to preserve thereof. As the storage device 604, for example, a magnetic disk device, an SSD (Solid State Drive), etc. can be used.

[Functional Configuration of Information Processing Device]

Figure 3:
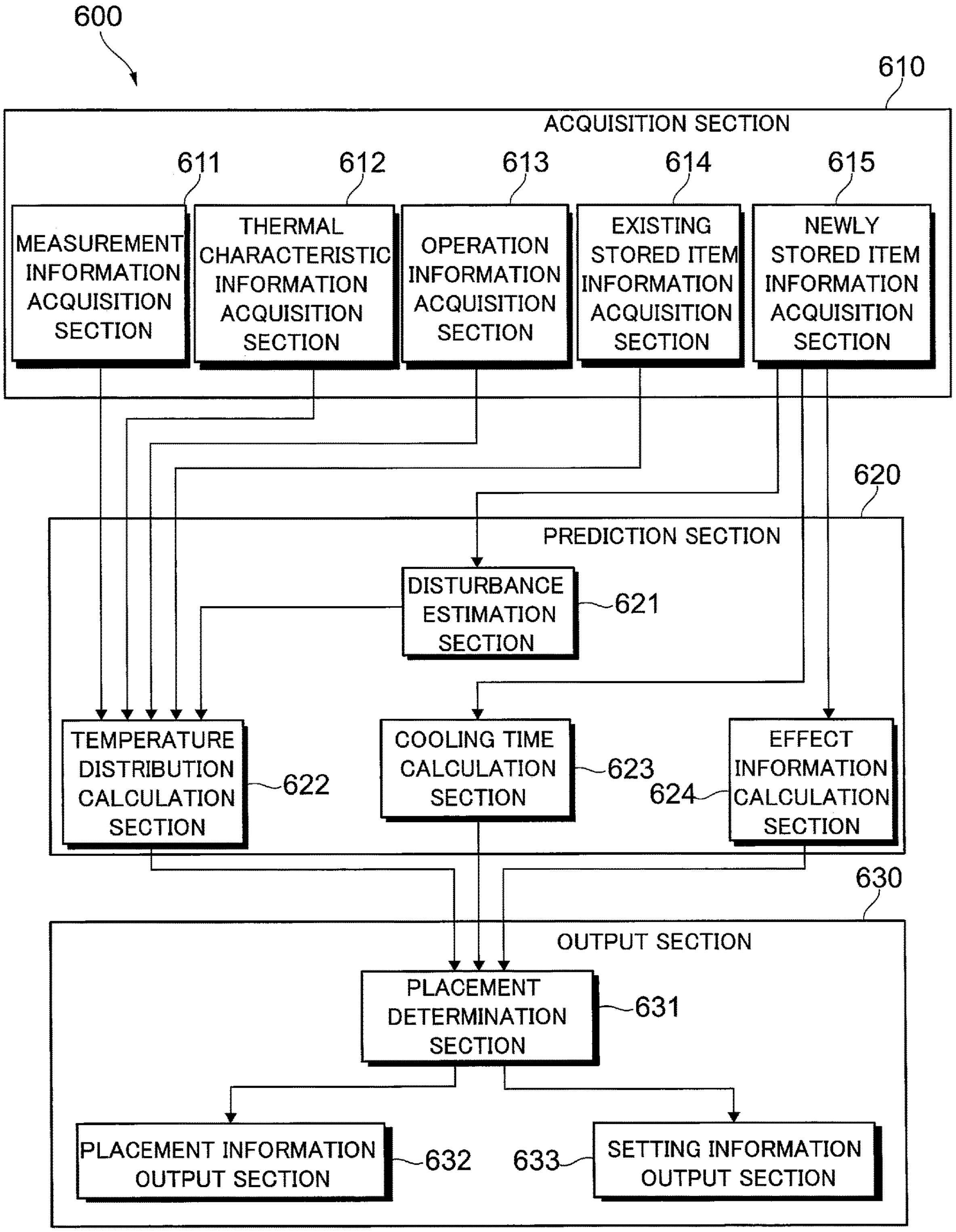
FIG. 3 is a block diagram showing a functional configuration example of the information processing device in the present embodiment.

FIG. 3 is a block diagram showing a functional configuration example of the information processing device 600 in the present embodiment. As shown in the figure, the information processing device 600 in the present embodiment includes an acquisition section 610, a prediction section 620, and an output section 630.

The acquisition section 610 acquires various pieces of information. The acquisition section 610 includes a measurement information acquisition section 611, a thermal characteristic information acquisition section 612, an operation information acquisition section 613, an existing stored item information acquisition section 614, and a newly stored item information acquisition section 615.

The measurement information acquisition section 611 acquires information indicating the temperature measured by the temperature sensor 400 (hereinafter referred to as "measurement information"). Here, the measurement information is the information of the current temperature at the position where the temperature sensor 400 is installed.

The thermal characteristic information acquisition section 612 acquires thermal characteristic information indicating the thermal characteristics in the freezer/refrigerator warehouse 100. For example, the thermal characteristic information acquisition section 612 should acquire the thermal characteristic information that has been calculated and stored in advance from the storage device 604. Here, the thermal characteristic information is a thermal diffusivity and a thermal conductivity from the position where the temperature sensor 400 is installed to a specific position.

The operation information acquisition section 613 acquires information about the operation of the freezing/refrigerating device 200 (hereinafter referred to as "operation information"). For example, the operation information acquisition section 613 should acquire the operation information from the control device 300. Here, the operation information includes the supply air temperature, the return air temperature, the wind speed, the wind direction, etc. in the freezing/refrigerating device 200.

The existing stored item information acquisition section 614 acquires information about the existing stored items that are the items already existing in the freezer/refrigerator warehouse 100 (hereinafter referred to as "existing stored item information"). For example, the existing stored item information acquisition section 614 should acquire the existing stored item information from the storage device 604 that stored the existing stored item information when the existing stored items were stored. Here, examples of the existing stored item information include information about heat emitted from the existing stored item. In the case where the existing stored items are foods that breathe (vegetables, fruits, etc.), heat is generated by breathing; therefore, the existing stored item information includes such heat information. In addition, examples of the existing stored item information include the placement positions, volumes, shapes, etc. of the existing stored items.

The newly stored item information acquisition section 615 acquires information about the newly stored items that are the items to be newly stored in the freezer/refrigerator warehouse 100 (hereinafter referred to as "newly stored item information"). For example, the newly stored item information acquisition section 615 should acquire the newly stored item information from the input/output device 500 by the user inputting the newly stored item information into the input/output device 500. In addition, the newly stored item information acquisition section 615 may acquire the newly stored item information from the storage device 604, the newly stored item information being associated with information input by the user to the input/output device 500 in advance and stored in the storage device 604. Furthermore, the newly stored item information acquisition section 615 may acquire the newly stored item information calculated from the information input by the user to the input/output device 500. Here, examples of the newly stored item information include the heat capacity, the heat transfer rate, the surface area, the current surface temperature, the current internal temperature, and the target temperature (storage temperature) of the newly stored items. In addition, examples of the newly stored item information also include information about heat emitted from the newly stored items. In the case where the newly stored items are foods that breathe (vegetables, fruits, etc.), heat is generated by breathing; therefore, the newly stored item information includes such heat information. Examples of the newly stored item information further include volumes, shapes, etc. of the newly stored items.

The prediction section 620 makes various predictions. The prediction section 620 includes a disturbance estimation section 621, a temperature distribution calculation section 622, a cooling time calculation section 623, and an effect information calculation section 624.

The disturbance estimation section 621 estimates disturbances that occur in the freezer/refrigerator warehouse 100 using the newly stored item information acquired by the newly stored item information acquisition section 615. Here, the disturbance is the opening and closing of the opening/closing door 120, etc. In this case, for example, if the number of newly stored items indicated by the newly stored item information is large, the time to open the opening/closing door 120 is considered to be longer; therefore, the disturbance estimation section 621 estimates a large disturbance. On the other hand, if the number of newly stored items indicated by the newly stored item information is small, the time to open the opening/closing door 120 is considered to be shorter; therefore, the disturbance estimation section 621 estimates a small disturbance.

The temperature distribution calculation section 622 first assumes a specific position p from among plural positions in the freezer/refrigerator warehouse 100, and calculates the temperature around the specific position. For this purpose, the temperature distribution calculation section 622 calculates the temperature difference ΔT, which is obtained by subtracting the temperature at the specific position p from the temperature Tm indicated by the measurement information acquired by the measurement information acquisition section 611, using a physical model that models the inside of the freezer/refrigerator warehouse 100. The physical model includes the following terms created using information acquired by the acquisition section 610 or estimated by the disturbance estimation section 621.

The first term prescribes the thermal diffusivity α and the thermal conductivity β from the position where the temperature sensor 400 is installed to the specific position p. The thermal diffusivity α and the thermal conductivity β are acquired by the thermal characteristic information acquisition section 612. Assuming that the distance from the position n where the temperature sensor 400 is installed to the specific position p is $k_1(n, p)$, the term is denoted as $f(\alpha, \beta, k_1(n, p))$.

The second term prescribes the effect on the temperature at the specific position p, the effects being determined from the supply air temperature Ts, the return air temperature Tr, the wind speed v, and the wind direction d of the indoor units 210 of the freezing/refrigerating device 200, and the interference i by the existing stored items. The supply air temperature Ts, the return air temperature Tr, the wind speed v, and the wind direction d are acquired by the operation information acquisition section 613. The interference i is information that changes depending on the position and stacking method, etc. of the existing stored items, and is acquired by the existing stored item information acquisition section 614. Assuming that the distance from the position n where the indoor unit 210 of the freezing/refrigerating device 200 is installed to the specific position p is $k_2(n, p)$, the term is denoted as $g(T_s, T_r, v, d, i, k_2(n, p))$.

The third term prescribes the effect of thermal information e exerted on the temperature at the specific position p by the existing stored item as a heating element. The thermal information e is acquired by the existing stored item information acquisition section 614. Assuming that the distance from the position n where the existing stored item is placed to the specific position p is $k_3(n, p)$, the term is denoted as $h(e, k_3(n, p))$.

The fourth term prescribes the disturbance γ estimated by the disturbance estimation section 621. Assuming that the distance from the position n where the disturbance γ occurs, such as the opening/closing door 120, etc. to the specific position p is $k_4(n, p)$, the term is denoted as $j(\gamma, k_4(n, p))$.

The temperature distribution calculation section 622 calculates the temperature difference ΔT by adding the above terms as in the following expression. However, in the following expression, the parentheses describing the parameters of the functions f, g, h, and j of the respective terms are omitted.

$$\Delta T = \sum_n f + \sum_n g + \sum_n h + \sum_n j \qquad \text{[Expression 1]}$$

The temperature distribution calculation section 622 then calculates the temperature at the specific position p by subtracting the temperature difference ΔT from the temperature $T_m$.

After that, the temperature distribution calculation section 622 calculates the temperature distribution in the freezer/refrigerator warehouse 100 by performing the same processing for all positions in the freezer/refrigerator warehouse 100 as the specific positions p.

In this way, it is preferable that the temperature distribution calculation section 622 calculates the temperature distribution in the freezer/refrigerator warehouse 100 by soft sensing using the temperature measured by the temperature sensor 400 and the physical model, but the temperature distribution may be calculated by CFD (computational fluid dynamics). In addition, the temperature distribution calculation section 622 may calculate the temperature distribution using the outside temperature, information of the neighboring warehouse, etc.

In the present embodiment, the temperature distribution calculation section 622 is provided as an example of the prediction section that predicts the temperature at each position in the warehouse.

The cooling time calculation section 623 calculates the time required to cool the newly stored item to the inside thereof (hereinafter referred to as "internal cooling time") using a physical model that models the newly stored item.

First, the cooling time calculation section 623 calculates the thermal time constant i of the newly stored item using the heat capacity C, the heat transfer rate h, and the surface area S of the newly stored item. The heat capacity C, the heat transfer rate h, and the surface area S of the newly stored item are acquired by the newly stored item information acquisition section 615. The cooling time calculation section 623 calculates the thermal time constant i by the following expression.

$$\tau = \frac{C}{h \cdot S} \qquad \text{[Expression 2]}$$

Next, using the thermal time constant τ, the temperature T(p) at a specific position p in the freezer/refrigerator warehouse 100, the current internal temperature $T_c$ of the newly stored item, and the target temperature (storage temperature) $T_t$, the cooling time calculation section 623 calculates the internal cooling time t(p) in the case where the newly stored item is placed at the specific position p. The current internal temperature $T_c$ and the target temperature (storage temperature) $T_t$ of the newly stored item are acquired by the newly stored item information acquisition section 615. The current internal temperature $T_c$ of the newly stored item is an example of temperature information of the item before being stored in the warehouse, and the target temperature (storage temperature) $T_t$ of the newly stored item is an example of target temperature information of the item to be stored in the warehouse. The cooling time calculation section 623 calculates the internal cooling time t(p) by the following expression.

$$t(p) = \tau \cdot \log \frac{T(p) - T_c}{T(p) - T_t} \quad \text{[Expression 3]}$$

Alternatively, the cooling time calculation section 623 does not need to calculate the exact internal cooling time if only the priority in cooling the newly stored items is to be determined; it is sufficient to determine the heat absorbing amount or the relative time required to cool each of the newly stored items to the inside. Consequently, the cooling time calculation section 623 may determine the priority from the difference between the current internal temperature of the newly stored item and the target temperature in addition to the thermal time constant, which is a rough indication of the time until the inside of the newly stored item cools.

In addition, the cooling time calculation section 623 may use any physical model in consideration of information that correlates with the cooling method of the newly stored item, not limited to the above physical model. The physical model may be a model using conductivity in the case where the stored items are in intimate contact with each other, for example. The physical model may be a model showing how a newly stored item will cool in the case where the newly stored item at a certain temperature is placed at a position of a certain wind speed. The physical model may be a model taking into account the temperature, the flow rate, the way of hitting by the ambient wind, the temperature of the circumference that is in contact with, the surface shape, specific heat, weight, volume, packing style of the stored item, etc. The physical model may also be a model that outputs a physical quantity of how much heat the item has with respect to the ambient temperature.

Furthermore, the cooling time calculation section 623 may determine the internal cooling time by an AI. In this case, the cooling time calculation section 623 uses, as training data, the weight before being stored, the surface area, the surface temperature, the internal temperature, target temperature (storage temperature), etc. for each type of the newly stored items. Then, the cooling time calculation section 623 should learn the thermal characteristics by machine learning the objective variable as the actual measurement value of the time until the internal temperature reaches the target temperature.

In the present embodiment, the cooling time calculation section 623 is provided as an example of the prediction section that predicts how the item stored in the warehouse cools.

The effect information calculation section 624 calculates the effect information indicating the effect of the thermal information e on the temperature of the specific position p of the newly stored item as a heating element in the case where the newly stored item is placed at the position n in the freezer/refrigerator warehouse 100 using a physical model that models the newly stored item. The thermal information e of a newly stored item is acquired by the newly stored item information acquisition section 615. Assuming that the distance from the position n where the newly stored item is placed to the specific position p is $k_3(n, p)$, the effect information is denoted as $h(e, k_3(n, p))$. The effect information calculation section 624 calculates the effect information u(p), which indicates the effect on the temperature at the specific position p, by adding the effect information $h(e, k_3(n, p))$ from plural newly stored items as in the following expression.

$$u(p) = \sum_n h(e, k_3(n, p)) \quad \text{[Expression 4]}$$

In the present embodiment, the effect information calculation section 624 is provided as an example of the prediction section that predicts the effect of the heat emitted by the item to be stored in the warehouse exerted on the temperature at each position in the warehouse.

The output section 630 outputs various pieces of information. The output section 630 includes a placement determination section 631, a placement information output section 632, and a setting information output section 633.

The placement determination section 631 determines appropriate placement of plural newly stored items based on the temperature distribution calculated by the temperature distribution calculation section 622, the internal cooling time calculated by the cooling time calculation section 623, and the effect information calculated by the effect information calculation section 624.

For example, the placement determination section 631 first calculates an average value of the internal cooling time of the plural newly stored items in the case where the plural newly stored items are placed in a specific placement pattern. Specifically, the placement determination section 631 calculates the temperature T(p) at the specific position p, where each of the plural newly stored items is placed, by superimposing the effect information u(p) calculated by the effect information calculation section 624 on the temperature at the specific position p calculated by the temperature distribution calculation section 622. The placement determination section 631 then calculates the internal cooling time t(p) for each of the plural newly stored items by applying the calculated temperature T(p) to the internal cooling time t(p) calculated by the cooling time calculation section 623. Thereafter, the placement determination section 631 calculates the average value of the internal cooling time t(p) of the plural newly stored items.

Next, the placement determination section 631 also calculates the average value of the internal cooling time t(p) of the plural newly stored items in the case where the plural newly stored items are placed in another placement pattern by performing the same processing.

After that, the placement determination section 631 calculates a placement pattern that results in the shortest average value of the internal cooling time t(p) of the plural newly stored items as the appropriate placement.

Alternatively, when a priority for cooling the newly stored items has been determined, the placement determination section 631 may determine the placement position of the newly stored items by checking the priority against the degree of cooling in the temperature distribution calculated by the temperature distribution calculation section 622.

The placement determination section 631 may also determine that the already cooled existing stored items are placed at positions in the freezer/refrigerator warehouse 100 where the temperature is relatively high. Furthermore, if it is assumed that a large number of newly stored items will be carried in and out, it may be determined that the newly stored items are placed away from the opening/closing door 120, which is highly affected by outside air entry.

The placement information output section 632 creates the placement information indicating the appropriate placement determined by the placement determination section 631 and outputs thereof to the input/output device 500.

By creating the placement information indicating the appropriate placement as determined above, the placement information proposes the placement of the stored items with which the items to be stored in the freezer/refrigerator warehouse 100 are cooled in a shorter time. In addition, the placement information may include information about the method of stacking the items to be stored in the freezer/refrigerator warehouse 100. Furthermore, the placement information may include instructions to place the items to be stored in the freezer/refrigerator warehouse 100 at predetermined intervals without placing the stored items in intimate contact with each other. For example, the placement information may include information on the distances between the items to be stored in the freezer/refrigerator warehouse 100 and other stored items.

Moreover, the placement information may be a placement image, for example. In that case, the placement image may represent the placement using an object image corresponding to the stored items on an image corresponding to the freezer/refrigerator warehouse 100, for example. Here, it is preferable that the image corresponding to the freezer/refrigerator warehouse 100 is three-dimensional representation of the freezer/refrigerator warehouse 100. The object image corresponding to the stored item should be an image such as a pin or an icon.

In addition, when placing the newly stored items in an empty freezer/refrigerator warehouse 100, the placement information output section 632 may create the placement information that proposes the placement positions of the newly stored items in accordance with the positions of the indoor units 210 of the freezing/refrigerating device 200. On that occasion, for example, if a stored item is placed in front of an air outlet of the indoor unit 210, it is difficult to cool behind the item; therefore, the placement information that proposes how to place other stored items may be created. Alternatively, when there have already been existing stored items in the freezer/refrigerator warehouse 100, the placement information output section 632 may create the placement information that proposes the placement of newly stored items.

In the present embodiment, the placement information is used as an example of the proposal information about the placement of the items to be stored in the warehouse, and the placement information output section 632 is provided as an example of the output section that outputs such proposal information.

The setting information output section 633 outputs the setting information about the setting of the freezing/refrigerating device 200 suitable for the placement determined by the placement determination section 631 to the input/output device 500. For example, suppose that the placement determination section 631 could not determine the appropriate placement of the stored items and determined placement close to the appropriate placement. In such a case, the setting information output section 633 informs the user of the setting information suitable for the determined placement by outputting thereof to the input/output device 500. In the present embodiment, the setting information is used as an example of the proposal information about the setting of the cooling device, and the setting information output section 633 is provided as an example of the output section that outputs such proposal information.

[Operation of Information Processing Device]

Figure 4:
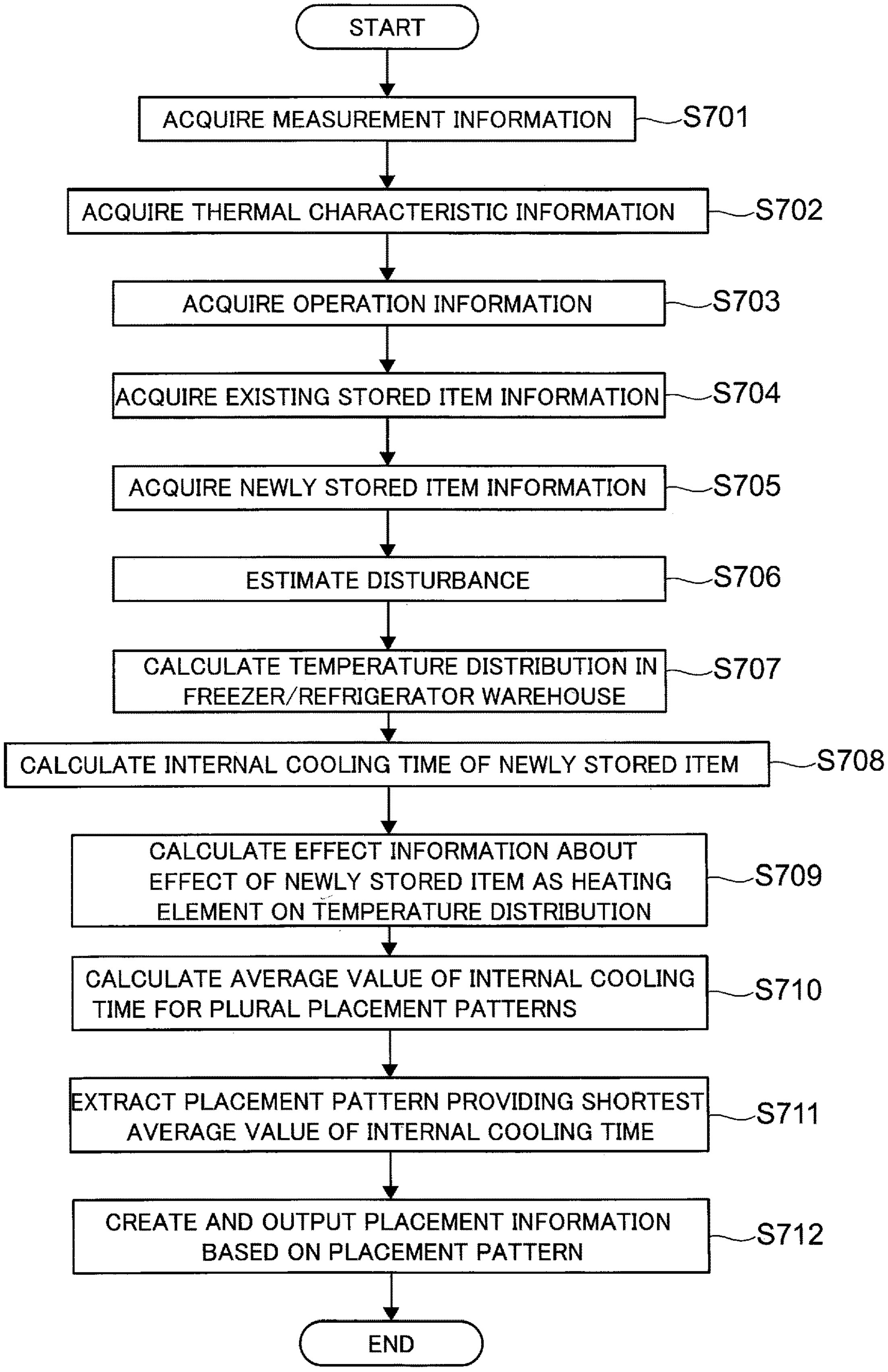
FIG. 4 is a flowchart showing an operation example of the information processing device in the present embodiment.

FIG. 4 is a flowchart showing an operation example of the information processing device 600 in the present embodiment.

As shown in the figure, in the information processing device 600, the measurement information acquisition section 611 first acquires the measurement information indicating the temperature measured by the temperature sensor 400 (step 701). In addition, the thermal characteristic information acquisition section 612 acquires the thermal characteristic information indicating the thermal characteristics in the freezer/refrigerator warehouse 100 (step 702). The operation information acquisition section 613 acquires the operation information about the operation of the freezing/refrigerating device 200 (step 703). The existing stored item information acquisition section 614 acquires the existing stored item information about the existing stored items already existing in the freezer/refrigerator warehouse 100 (step 704). The newly stored item information acquisition section 615 acquires the newly stored item information about the newly stored items to be newly stored in the freezer/refrigerator warehouse 100 (step 705).

Next, in the information processing device 600, the disturbance estimation section 621 estimates the disturbance based on the newly stored item information acquired in step 705 (step 706).

Subsequently, the temperature distribution calculation section 622 calculates the temperature distribution in the freezer/refrigerator warehouse 100 based on the measurement information acquired in step 701, the thermal characteristic information acquired in step 702, the operation information acquired in step 703, the existing stored item information acquired in step 704, and the disturbance estimated in step 706 (step 707). Specifically, the temperature distribution calculation section 622 calculates the temperature difference between the measurement position by the temperature sensor 400 and the specific position based on the physical model using the thermal characteristic information, the operation information, the existing stored item information, and the disturbance. The temperature distribution calculation section 622 then calculates the temperature at the specific position by subtracting the temperature difference from the temperature indicated by the measurement information. After that, the temperature distribution calculation section 622 calculates the temperature distribution in the freezer/refrigerator warehouse 100 by performing the same processing for all positions in the freezer/refrigerator warehouse 100 as the specific positions.

In addition, the cooling time calculation section 623 calculates the internal cooling time of the newly stored items based on the newly stored item information acquired in step 705 (step 708). Specifically, the cooling time calculation section 623 calculates the thermal time constant by the physical model using the heat capacity, the heat transfer rate, and the surface area of the newly stored item. Then, by the physical model using the thermal time constant, the current internal temperature and the target temperature (storage temperature) of the newly stored item, the internal cooling time in the case where the newly stored item is placed at the specific position is calculated.

Furthermore, the effect information calculation section 624 calculates the effect information indicating the effect of the newly stored item as a heating element on the temperature distribution based on the newly stored item information acquired in step 705 (step 709). Specifically, the effect information calculation section 624 calculates the effect information indicating the effect on the temperature at a specific position in the case where plural newly stored items are placed at other positions by the physical model using information about the heat emitted by the newly stored items. The effect information calculation section 624 then calculates the effect information indicating the effect on the temperature distribution by adding the effect information from the plural newly stored items.

Thereafter, in the information processing device 600, the placement determination section 631 calculates the average value of the internal cooling time of the plural newly stored items for each of the plural placement patterns of the newly stored items based on the temperature distribution calculated in step 707, the internal cooling time calculated in step 708, and the effect information calculated in step 709 (step 710). Specifically, in the case where the plural newly stored items are placed in a specific placement pattern, the placement determination section 631 calculates the temperature at the specific positions where the plural newly stored items are placed by superimposing the effect information calculated by the effect information calculation section 624 on the temperature at the specific position calculated by the temperature distribution calculation section 622. The placement determination section 631 then calculates the internal cooling time for the plural newly stored items by applying the temperature at these specific positions to the internal cooling time calculated by the cooling time calculation section 623. Thereafter, the placement determination section 631 calculates the average value of the internal cooling time for the plural newly stored items.

Next, the placement determination section 631 extracts the placement pattern with the shortest average value of the internal cooling time calculated in step 710 from among the plural placement patterns for the newly stored items (step 711).

Subsequently, the placement information output section 632 creates the placement information based on the placement pattern extracted in step 711 and outputs the placement information to the input/output device 500 (step 712).

[Screen Example]

Figure 5:
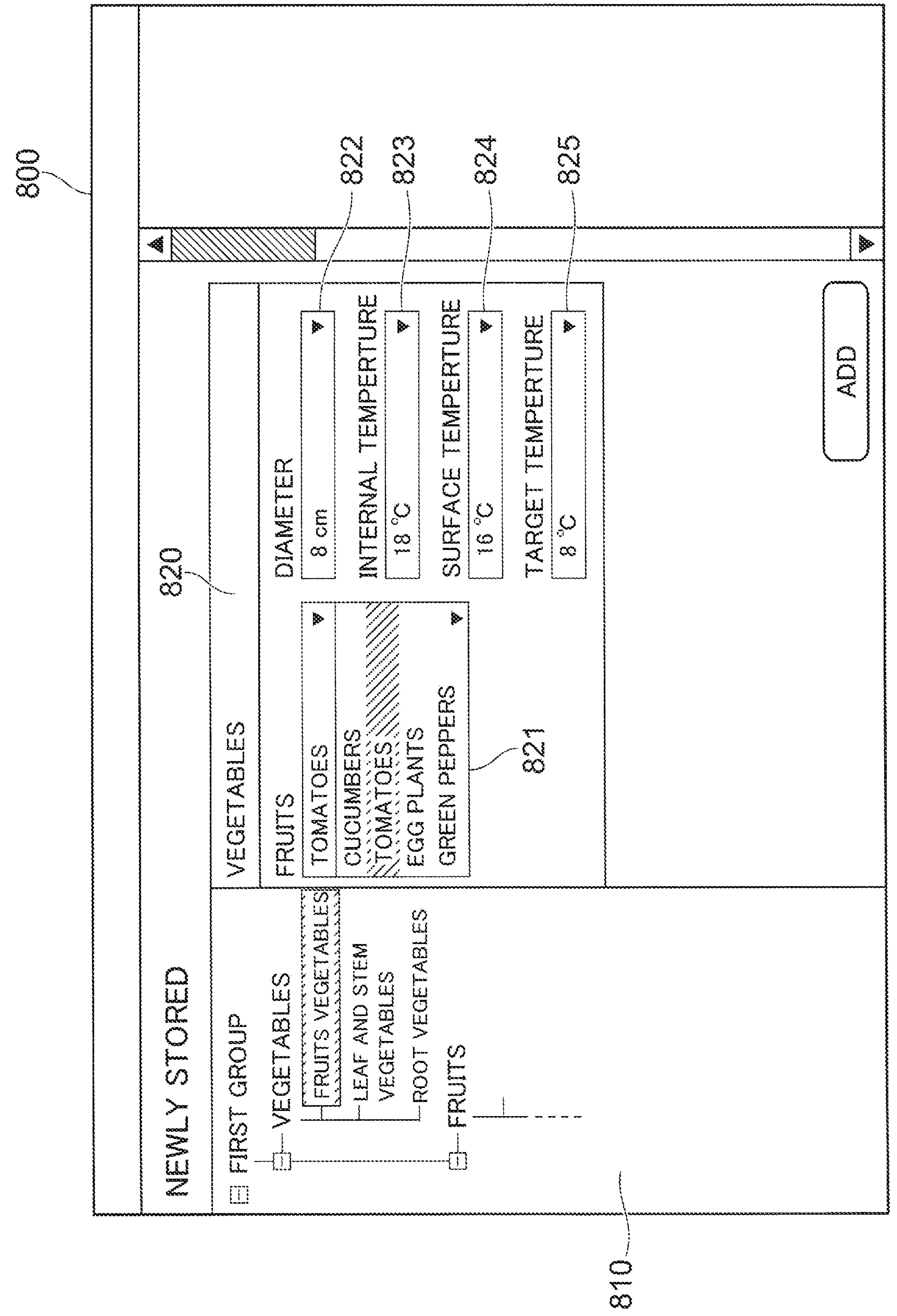
FIG. 5 is a diagram showing an example of an input screen for inputting newly stored item information obtained in the present embodiment.

FIG. 5 is a diagram showing an example of an input screen 800 for inputting the newly stored item information acquired in step 705 shown in FIG. 4.

As shown in the figure, the input screen 800 includes a classification selection area 810 and an information input area 820. In the figure, since “fruits and vegetables” is selected in the classification selection area 810, articles belonging to the fruits and vegetables are displayed in the article selection field 821 in the information input area 820. In addition, in the figure, “tomatoes” that are to be stored is selected from these articles in the article selection field 821; accordingly, information about tomatoes is input in each input field in the information input area 820. Specifically, “8 cm” is input as the diameter in the diameter input field 822. Then, “18° C.” is input as the internal temperature in the internal temperature input field 823, “16° C.” is input as the surface temperature in the surface temperature input field 824, and “8° C.” is input as the target temperature (storage temperature) in the target temperature input field 825. Note that, as for the heat capacity and heat transfer rate of tomatoes, the preset values for tomatoes should be acquired by selecting “tomatoes” in the article selection field 821. In addition, for the surface area of the tomato, the value calculated from the diameter input in the diameter input field 822 should be acquired.

Figure 6:
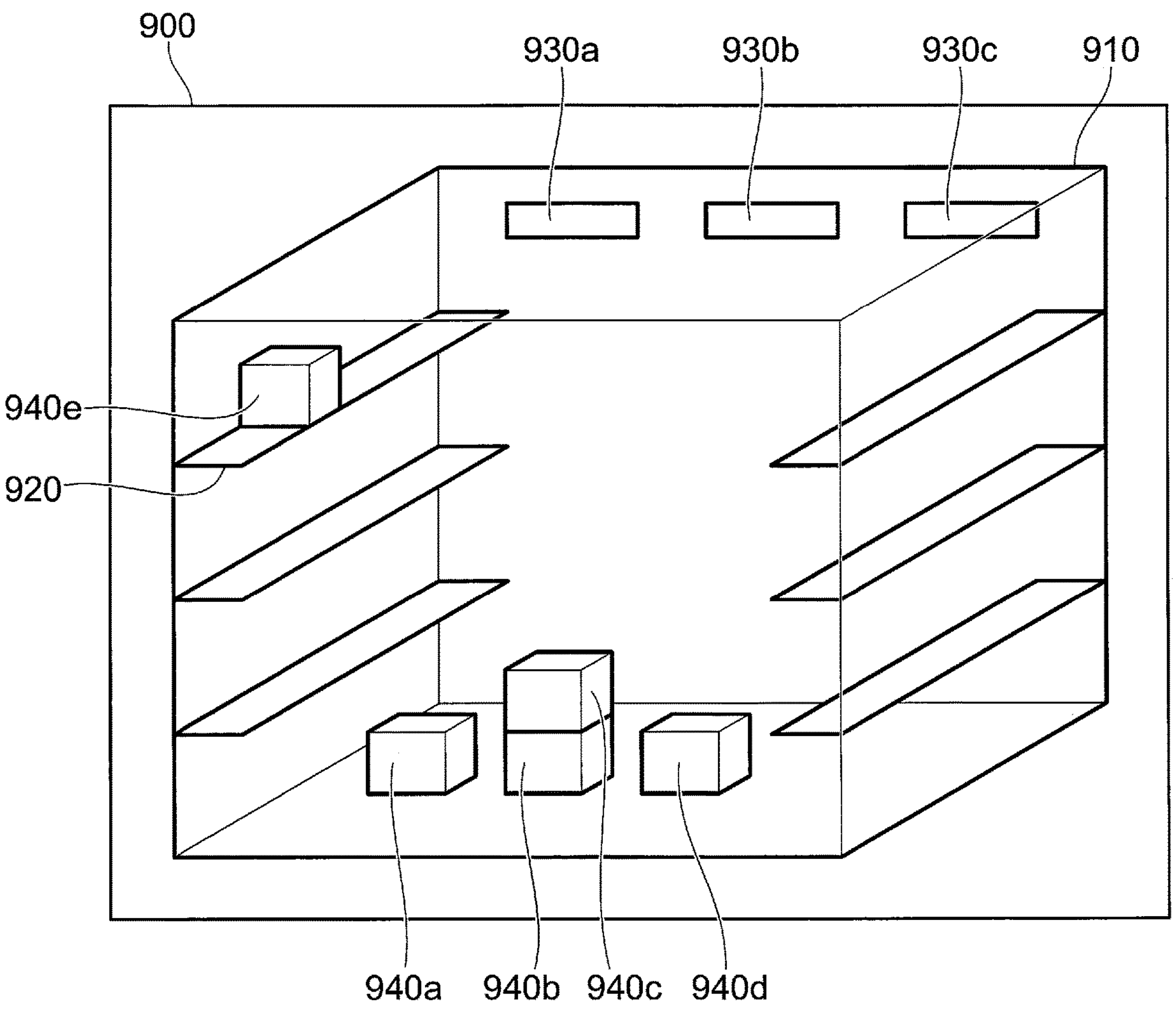
FIG. 6 is a diagram showing an example of an output screen of the present embodiment to which placement information is output.

FIG. 6 is a diagram showing an example of an output screen 900, to which the placement information is output in step 712 in FIG. 4.

As shown in the figure, the output screen 900 shows a warehouse object 910 that represents the freezer/refrigerator warehouse 100 in three dimensions. In addition, on the warehouse object 910, shelf objects 920 representing shelves of the freezer/refrigerator warehouse 100 and indoor unit objects 930*a* to 930*c* representing the indoor units 210*a* to 210*c* of the freezing/refrigerating device 200 are shown. The appropriate placement positions of the stored items are indicated by the positions of the stored item objects 940*a* to 940*e* on the warehouse object 910. Here, in particular, it is indicated that the stored item represented by the stored item object 940*c* should be stacked on top of the stored item represented by the stored item object 940*b*. It is also indicated that the stored item represented by the stored item object 940*e* should be placed on the shelf represented by the shelf object 920.

Figure 7A:
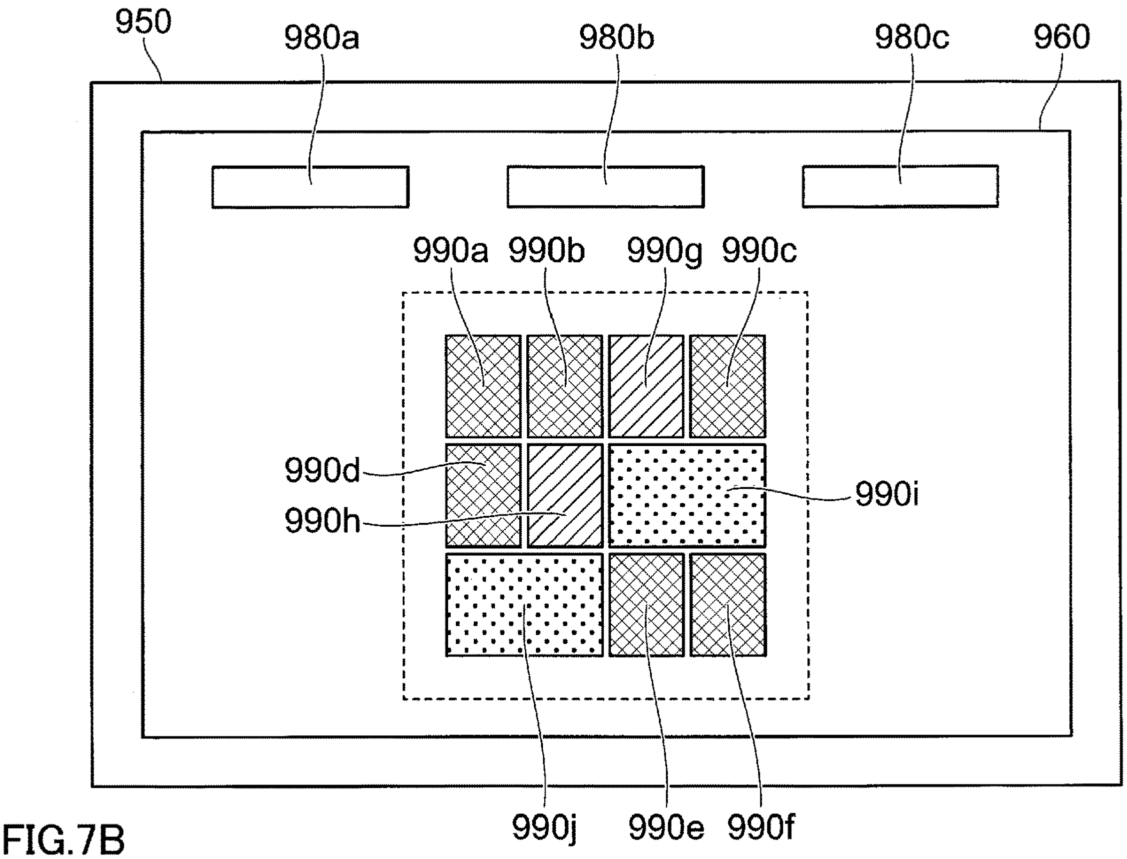
FIGS. 7A and 7B are diagrams each illustrating the output screen of the present embodiment to which another placement information is output.
Figure 7B:
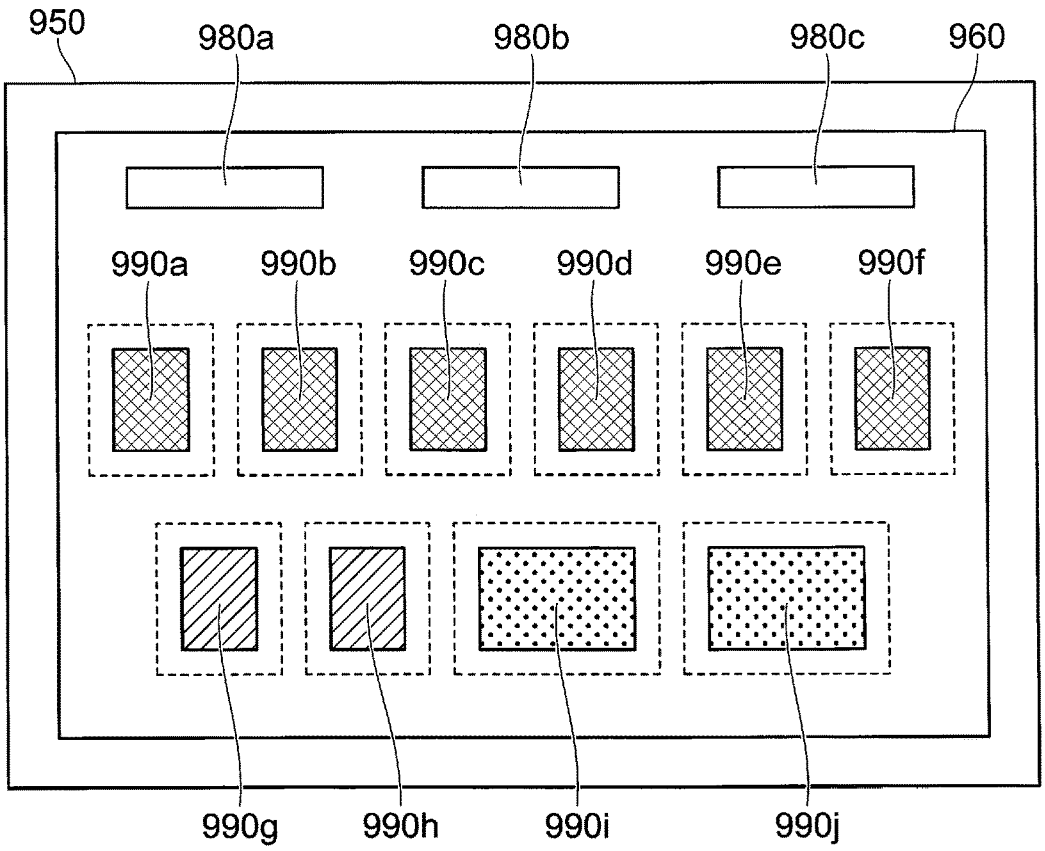

FIGS. 7A and 7B are diagrams each illustrating the output screen to which another placement information is output. In the freezer/refrigerator warehouse 100, it is meaningless to cool only the surface of the stored items, and it is important to cool the inside of the stored items. Therefore, the output screen 950 proposes the placement positions of the stored items so that the inside of the stored items is cooled quickly. Note that, also in this case, in the freezer/refrigerator warehouse 100, it is assumed that the temperature around the stored item is predicted by soft sensing. In addition, it is assumed that the size and shape of the freezer/refrigerator warehouse 100 are known from the drawing information.

As shown in the figure, the output screen 950 shows the warehouse object 960 that represents the freezer/refrigerator warehouse 100. In addition, on the warehouse object 960, the indoor unit objects 980*a* to 980*c* representing the indoor units 210*a* to 210*c* of the freezing/refrigerating device 200 are shown. Then, the placement positions of the stored items are indicated by the positions of the stored item objects 990*a* to 990*j* on the warehouse object 960. It is assumed that, of these, the stored items represented by cross-hatched stored item objects 990*a* to 990*f* have high specific heat, heavy weight, medium volume, and a rectangular parallelepiped shape. In addition, it is assumed that the stored items represented by diagonally hatched stored item objects 990*g* and 990*h* have medium specific heat, light weight, medium volume, and a rectangular parallelepiped shape. Furthermore, it is assumed that the stored items represented by dot-hatched stored item objects 990*i* and 990*j* have low specific heat, light weight, large volume, and a rectangular parallelepiped shape.

Under such a premise, suppose that the output screen 950 shown in FIG. 7A is displayed in the initial state. In this placement of the stored items, only the stored items at the periphery of the ten stored items are cooled, as indicated by the broken line. Therefore, the output screen 950 shown in FIG. 7B proposes a placement change for the newly stored items to be stored. This indicates that the stored items with high specific heat and heavy weight, such as those represented by cross-hatched stored item objects 990*a* to 990*f*, should be moved to locations that are more likely to be hit by airflow. This also indicates that the placement with proper spacing cools the ten stored items quickly. Note that the placement information in this output screen 950 is calculated based on the size of the freezer/refrigerator warehouse 100, the operation information of the freezing/refrigerating device 200, and the information of the stored items, etc.

[Program]

The processing performed by the information processing device 600 in the present embodiment is provided as, for example, a program such as application software.

This program causes a computer to implement a function to predict how items cool in a chamber performing freezing or refrigerating, and a function to output proposal information about placement of items to be stored in the chamber, based on the predicted cooling of the items in the chamber.

Note that it is possible to provide the program that implements the present embodiment by a communication tool, of course, and it is also possible to store thereof in a storage medium, such as a CD-ROM, to be provided.

REFERENCE SIGNS LIST

10 Freezing/refrigerating system
100 Freezer/refrigerator warehouse
200 Freezing/refrigerating device
300 Control device
400 Temperature sensor
500 Input/output device
600 Information processing device
610 Acquisition section
611 Measurement information acquisition section
612 Thermal characteristic information acquisition section
613 Operation information acquisition section
614 Existing stored item information acquisition section
615 Newly stored item information acquisition section
620 Prediction section
621 Disturbance estimation section
622 Temperature distribution calculation section
623 Cooling time calculation section
624 Effect information calculation section
630 Output section
631 Placement determination section
632 Placement information output section
633 Setting information output section

The invention claimed is:

1. An information processing device comprising:

a prediction section predicting how a stored item cools in a chamber performing freezing or refrigerating; and an output section outputting proposal information about placement of an item to be stored in the chamber based on how the stored item cools as predicted by the prediction section, wherein the prediction section predicts a temperature at each position in the chamber, the output section outputs the proposal information further based on the temperature at each position in the chamber predicted by the prediction section, the prediction section predicts effect of heat emitted by an item to be stored in the chamber on the temperature at each position in the chamber, and the output section outputs the proposal information further based on the effect on the temperature at each position in the chamber, the effect being predicted by the prediction section.

2. The information processing device according to claim 1, wherein the prediction section predicts how a stored item cools in the chamber using a thermal time constant of an item to be stored in the chamber.

3. The information processing device according to claim 2, wherein the prediction section predicts how a stored item cools in the chamber further using temperature information of an item to be stored in the chamber before being stored.

4. The information processing device according to claim 2, wherein the prediction section predicts how a stored item cools in the chamber further using target temperature information of an item to be stored in the chamber.

5. The information processing device according to claim 1, wherein the prediction section predicts how a stored item cools in the chamber using a physical model that models an item to be stored in the chamber.

6. The information processing device according to claim 1, wherein the prediction section predicts the temperature at each position in the chamber using measurement information of a temperature measured at a predetermined position in the chamber.

7. The information processing device according to claim 6, wherein the prediction section predicts the temperature at each position in the chamber further using thermal characteristics inside the chamber.

8. The information processing device according to claim 6, wherein the prediction section predicts the temperature at each position in the chamber further using operation information of a cooling device performing freezing or refrigerating inside the chamber.

9. The information processing device according to claim 6, wherein the prediction section predicts the temperature at each position in the chamber further using information of heat emitted by a stored item already existing in the chamber.

10. The information processing device according to claim 6, wherein the prediction section predicts the temperature at each position in the chamber further using information of disturbance caused in the chamber.

11. The information processing device according to claim 1, wherein the prediction section predicts the temperature at each position in the chamber using a physical model that models an interior of the chamber.

12. The information processing device according to claim 1, wherein the prediction section predicts the effect on the temperature at each position in the chamber using a physical model that models an item to be stored in the chamber.

13. The information processing device according to claim 1, wherein the output section outputs the proposal information proposing placement of an item to be stored in the chamber, the placement cooling the item in a shorter time.

14. The information processing device according to claim 1, wherein the output section outputs the proposal information including information on how to stack an item to be stored in the chamber.

15. The information processing device according to claim 1, wherein the output section outputs the proposal information including information on a distance between an item to be stored in the chamber and another stored item.

16. The information processing device according to claim 1, wherein the output section outputs the proposal information representing the placement using an object image corresponding to an item to be stored in the chamber.

17. The information processing device according to claim 1, wherein the output section outputs the proposal information based on setting of a cooling device performing freezing or refrigerating inside the chamber.

18. A non-transitory computer readable medium storing a program causing a computer to implement:

a function of predicting how a stored item cools in a chamber performing freezing or refrigerating;

a function of outputting proposal information on placement of an item to be stored in the chamber based on how the stored item cools as predicted, predicting a temperature at each position in the chamber, outputting the proposal information further based on the temperature at each position in the chamber as predicted, predicting effect of heat emitted by an item to be stored in the chamber on the temperature at each position in the chamber, and outputting the proposal information further based on the effect on the temperature at each position in the chamber, the effect being as predicted.

19. An information processing device comprising:

a prediction section that predicts a time required to cool items to inside thereof stored in a chamber performing freezing or refrigerating, a temperature at each position in the chamber, and an effect of heat emitted by the items stored in the chamber on the temperature at each position in the chamber; and an output section that outputs suggested information regarding a placement of the items to be stored in the chamber based on the time required to cool the items to the inside thereof, the temperature at each position in the chamber, and the effect of the heat emitted by the items stored in the chamber on the temperature at each position in the chamber, which are predicted by the prediction unit.

* * * * *